US009936098B2

(12) United States Patent
Yamagata et al.

(10) Patent No.: US 9,936,098 B2
(45) Date of Patent: Apr. 3, 2018

(54) IMAGE COMBINATION DEVICE, IMAGE READING DEVICE AND IMAGE COMBINATION METHOD

(71) Applicant: Mitsubishi Electric Corporation, Chiyoda-ku (JP)

(72) Inventors: Kosaku Yamagata, Chiyoda-ku (JP); Tadashi Minobe, Chiyoda-ku (JP); Satoshi Yamanaka, Chiyoda-ku (JP); Masako Asamura, Chiyoda-ku (JP); Yoshitaka Toyoda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/540,125

(22) PCT Filed: Jan. 27, 2016

(86) PCT No.: PCT/JP2016/052287
§ 371 (c)(1),
(2) Date: Jun. 27, 2017

(87) PCT Pub. No.: WO2016/163133
PCT Pub. Date: Oct. 13, 2016

(65) Prior Publication Data
US 2018/0007232 A1  Jan. 4, 2018

(30) Foreign Application Priority Data
Apr. 9, 2015  (JP) .................................. 2015-080093

(51) Int. Cl.
*H04N 1/00*  (2006.01)
*H04N 1/19*  (2006.01)
(Continued)

(52) U.S. Cl.
CPC .......... *H04N 1/387* (2013.01); *H04N 1/00795* (2013.01); *H04N 1/1903* (2013.01); *H04N 1/1933* (2013.01); *H04N 1/3876* (2013.01)

(58) Field of Classification Search
CPC ........... H04N 1/00795; H04N 1/00798; H04N 1/00816; H04N 1/19–1/2038; H04N 1/387–1/3876
See application file for complete search history.

(56) References Cited

U.S. PATENT DOCUMENTS 5,465,163 A * 11/1995 Yoshihara ............. G06T 3/4038
358/444
5,481,375 A *  1/1996 Eto .................... H04N 1/00795
358/450
(Continued)

FOREIGN PATENT DOCUMENTS

JP     2004-120705 A      4/2004
JP     2010109465 A  *   5/2010
(Continued)

OTHER PUBLICATIONS

International Search Report dated Apr. 26, 2016, in PCT/JP2016/052287, filed Jan. 27, 2016.

*Primary Examiner* — Scott A Rogers
(74) *Attorney, Agent, or Firm* — Oblon, McClelland, Maier & Neustadt, L.L.P.

(57) ABSTRACT

Image processors are provided for respective groups formed by grouping of images, the order of which is sequential when images respectively having overlapping portions corresponding to the same portion of an object are arranged so as to be adjacent to each other, and concurrently perform processing to detect combining-position information for combining an image in a group and an image adjacent to the image without any positional displacement by image-matching. The combining-position information between images
(Continued)

belonging to different groups is respectively transferred, via combination-information transferring paths, between the image processors and between the image processors.

7 Claims, 13 Drawing Sheets

(51) Int. Cl.
  *H04N 1/193* (2006.01)
  *H04N 1/387* (2006.01)

(56) References Cited

U.S. PATENT DOCUMENTS

| | | | | |
|---|---|---|---|---|
| 5,532,845 A | * | 7/1996 | Gusmano | H04N 1/1912 358/408 |
| 6,002,492 A | * | 12/1999 | Kamon | H04N 1/04 358/450 |
| 6,348,981 B1 | * | 2/2002 | Walsh | H04N 1/191 250/208.1 |
| 6,373,995 B1 | * | 4/2002 | Moore | G06K 9/20 345/629 |
| 7,440,145 B2 | * | 10/2008 | Kuwabara | H04N 1/1903 358/1.18 |
| 8,228,566 B2 | * | 7/2012 | Kawano | H04N 1/0306 358/474 |
| 9,398,173 B2 | * | 7/2016 | Verhaegh | H04N 1/19 |
| 2010/0253849 A1 | | 10/2010 | Kegasawa | |
| 2013/0155472 A1 | * | 6/2013 | Kawano | G03G 15/60 358/450 |
| 2016/0352957 A1 | * | 12/2016 | Aikawa | H04N 1/053 |
| 2017/0289395 A1 | * | 10/2017 | Ishiguro | H04N 1/3876 |

FOREIGN PATENT DOCUMENTS

| | | | |
|---|---|---|---|
| JP | 2010-244184 A | | 10/2010 |
| JP | 5322885 B2 | | 10/2013 |
| JP | 2017108323 A | * | 6/2017 |
| WO | WO 2016147832 A1 | * | 9/2016 |

\* cited by examiner

IMAGE COMBINATION DEVICE, IMAGE READING DEVICE AND IMAGE COMBINATION METHOD

TECHNICAL FIELD

The present disclosure relates to an image-combining apparatus, an image-reading apparatus, and an image-combining method.

BACKGROUND ART

Image-reading apparatuses that use a line sensor group composed of short line sensors arranged in a staggered pattern in a lengthwise direction to read a paper document is in use. For such kind of image-reading apparatus, generally the lengthwise direction of the line sensor (array direction) is referred to as the main scanning direction whereas the direction that is perpendicular to the lengthwise direction of the line sensor is referred to as the sub-scanning direction. The detection ranges of the line sensors, which are disposed in the main scanning direction of the line sensor group, partially overlap with each other as viewed from the sub scanning direction.

The paper document is relatively scanned in the sub-scanning direction by the line sensor group, enabling each line sensor to read a portion of the paper document. The images read by the line sensors are combined together at the overlapping portions and finally are synthesized into a single page of image data.

A method for detecting a position for combining images relating to the sub-scanning direction based on a degree of correlation in image-matching between the images captured by the line sensors is disclosed as a method for combining images read by the line sensors (for example: refer to Patent Literature 1).

CITATION LIST

Patent Literature

Patent Literature 1: Japanese Patent No. 5322885

SUMMARY OF INVENTION

Technical Problem

Nowadays, the number of line sensors is being increased so that large-sized paper documents can be read. When the number of line sensors is increased, more time is needed to detect all of the combining positions between images, and thus combining images quickly becomes difficult.

In order to solve the aforementioned problem, an objective of the present disclosure is to provide an image-combining apparatus, an image-reading apparatus, and an image-combining method that can quickly combine a row of images together.

Solution to Problem

In order to achieve the above-mentioned objective, an image-combining apparatus according to the present disclosure includes a plurality of image processors provided for respective groups of images formed by grouping of the images in an image row into sequentially ordered images, each image in the image row having an overlapping portion that is a portion overlapping with a portion of another image, the image row having adjacent images that have the overlapping portions corresponding to a same portion of an object, the plurality of image processors concurrently performing processing to detect, by image-matching, combining-position information for combining a first image within one group and a second image in a position that is adjacent to the first image in the image row without any positional displacement; the image data transferring path and a combination-information transferring path. An image data transferring path transfers an image of the overlapping portion of the second image belonging to a group different from the first image to the image processor that processes the first image having an overlapping portion corresponding to the same portion of the object, the image of the overlapping portion of the second image being a head of the images of a group corresponding to each image processor of the plurality of image processors. The combination-information transferring path transfers, between the plurality of image processors, combining-position information between the first image and the second image belonging to a group different from the first image. Each image processor of the plurality of image processors combines, based on the combining-position information self-detected and the combining-position information transferred via the combination-information transferring path, the images belonging to the corresponding group without any positional displacement while combining the images belonging to the corresponding group with an image belonging to another group without any positional displacement between adjacent images across different groups.

Advantageous Effects of Invention

According to the present disclosure, groups of images are formed by grouping of the images in an image row into sequentially ordered images, each image in the image row having an overlapping portion that is a portion overlapping with a portion of another image, the image row having adjacent images that have the overlapping portions corresponding to a same portion of an object, and regarding a first image within one group and a second image in a position that is adjacent to the first image, since the combining-position information is detected concurrently in each group, the time taken to detect the combining-position information of these images can be reduced. Also, the combining-position information between the first image and the second image that is adjacent to the first image and belongs to a different group is sent and received to and from image processors via a combination-information transferring path. Therefore, each image processor can combine, the images belonging to the corresponding group without any positional displacement while combining the images belonging to the corresponding group with an image belonging to another group without any positional displacement. As a result, the images in the row of images can be quickly combined together.

DESCRIPTION OF EMBODIMENTS

Embodiments of the present disclosure are described hereinafter with reference to the drawings.

Figure 1:
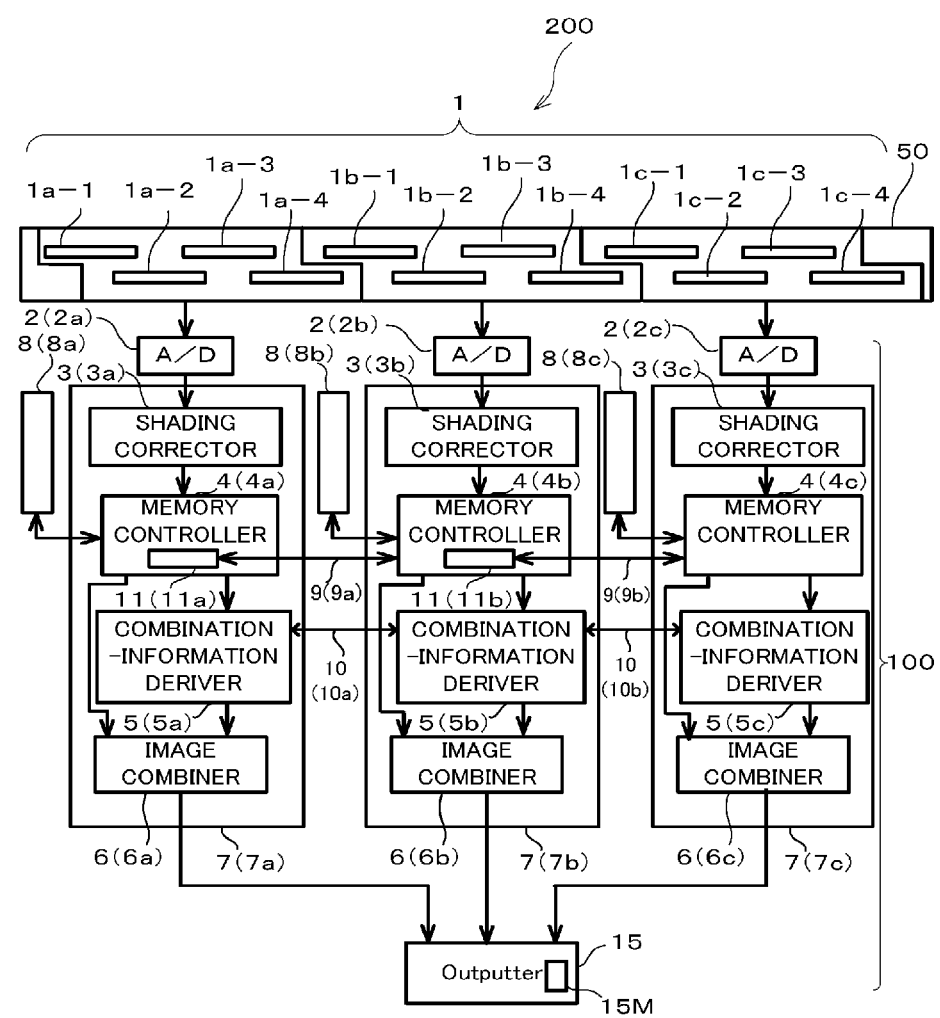
FIG. 1 is a block diagram illustrating a configuration of an image-reading apparatus according to an embodiment of the present disclosure.

FIG. 1 is a block diagram illustrating a configuration of an image-reading apparatus according to an embodiment of the present disclosure. As illustrated in FIG. 1, an image-reading apparatus 200 includes a line sensor group 1 formed on a substrate 50. The line sensor group 1 is made up of line sensors 1a-1 to 1a-4, 1b-1 to 1b-4, and 1c-1 to 1c-4.

The line sensors 1a-1 to 1a-4, 1b-1 to 1b-4, and 1c-1 to 1c-4 are sensors formed of a Charge Coupled Device (CCD) or a Complementary Metal Oxide Semiconductor (CMOS), each line sensor including one-dimensionally arrayed image-capturing elements. The line sensors 1a-1 to 1a-4, 1b-1 to 1b-4, and 1c-1 to 1c-4 output an analog signal in accordance with the intensity of luminous flux that enters each of the image-capturing elements arrayed in a lengthwise direction. The line sensors 1a-1 to 1a-4, 1b-1 to 1b-4, and 1c-1 to 1c-4 output an analog signal repeatedly at constant cycles.

Figure 2:
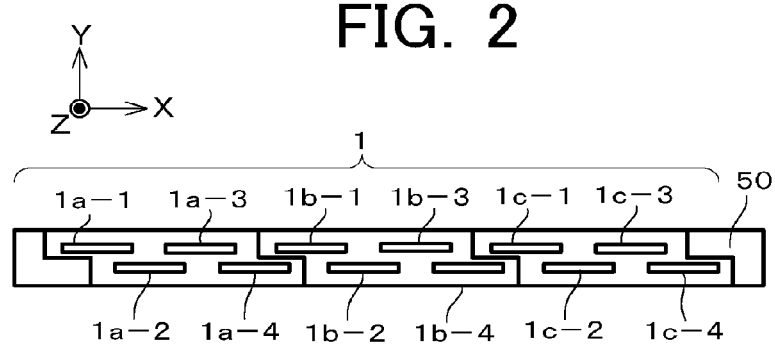
FIG. 2 is a diagram illustrating an array of a line sensor group in the image-reading apparatus according to an embodiment of the present disclosure.

FIG. 2 is a diagram illustrating an array of a line sensor group in the image-reading apparatus according to an embodiment of the present disclosure. As illustrated in FIG. 2, the line sensors 1a-1 to 1a-4, 1b-1 to 1b-4, and 1c-1 to 1c-4 extend in the lengthwise direction and are disposed in a staggered pattern in the lengthwise direction.

The XYZ Cartesian coordinate system having an X-axis, Y-axis, and Z-axis is defined in FIG. 2. In this embodiment, the X-axis direction, which is the lengthwise direction of the line sensors 1a-1 to 1a-4, 1b-1 to 1b-4, and 1c-1 to 1c-4, is referred to as the main scanning direction. Also, the Y-axis direction is referred to as the sub-scanning direction, which is perpendicular to the main scanning direction. The Z-axis direction is referred to as the depth direction, which is perpendicular to both the main scanning direction and the sub-scanning direction. When the line sensor group 1 is viewed from the sub-scanning direction, the measuring areas of adjacent line sensors partially overlap with each other.

Figure 3:
FIG. 3 is a diagram illustrating an example of a paper document to be read by the image-reading apparatus.

FIG. 3 is a diagram illustrating an example of a paper document to be read by the image-reading apparatus. As illustrated in FIG. 3, an image of the letters "ABCDEFGH" is formed on the paper document 20 in the main scanning direction (X-axis direction), for example. In this embodiment, a description is given of a case of the line sensors 1a-1 to 1a-4, 1b-1 to 1b-4, and 1c-1 to 1c-4 capturing the subject to be captured (object), that is, the image "ABCDEFGH" of the paper document 20.

Figure 4:
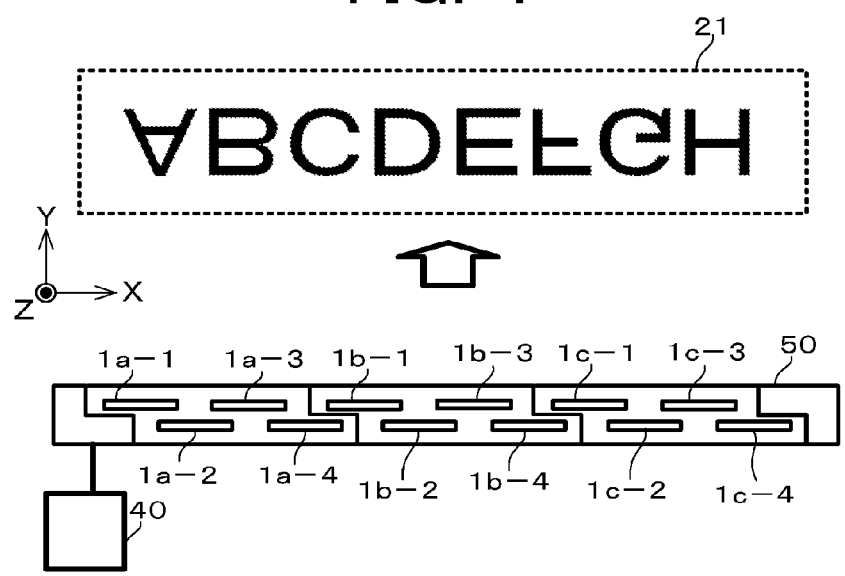
FIG. 4 is a diagram illustrating relative scanning between a line sensor group and an image of the paper document.

FIG. 4 is a diagram illustrating relative scanning between the line sensor group and an image of the paper document. In the image-reading apparatus 200, light that emits from an illumination light source, and then reflects on the paper document 20, as illustrated in FIG. 4, arrives, at a position where a substrate 50 is scanned via an optical image forming system, and at this position, an image 21 of the paper document 20 is formed. A scan driver 40 of the image-reading apparatus 200 causes the line sensor group 1 relative to the image 21 of the paper document 20 to scan at a fixed speed in the sub-scanning direction (Y-axis direction), and the line sensor group 1 traverses across the image 21 of the paper document 20. As a result of this scanning, the "ABCDEFGH" of the paper document 20 is captured by the line sensor group 1.

Figure 5:
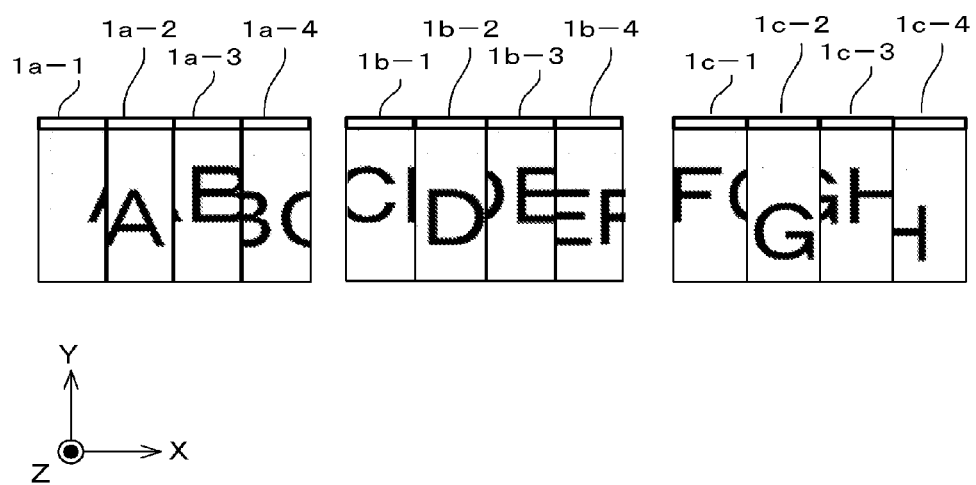
FIG. 5 is a diagram illustrating an example of images captured by the line sensors.

FIG. 5 is a diagram illustrating an example of the images captured by the line sensors. The line sensors 1a-1 to 1a-4, 1b-1 to 1b-4, and 1c-1 to 1c-4 each capture a portion of the image 21 of the paper document 20 as the object. As illustrated in FIG. 5, the images captured the line sensors 1a-1 to 1a-4, 1b-1 to 1b-4, and 1c-1 to 1c-4 form a row of images arranged in an order such that images having approximately the same capturing positions of the object, in the main scanning direction, are adjacent to each other. Since the line sensors 1a-1 to 1a-4, 1b-1 to 1b-4, and 1c-1 to 1c-4 are arranged in a staggered pattern, that is, are arranged alternately in two rows in the X-axis direction, the image captured by each line sensor is displaced in the sub-scanning direction. Also, since the detection ranges of the line sensors next to each other in different rows partially overlap as viewed in the sub-scanning direction, the images captured by the adjacent line sensors partially overlap with each other. Thus, the images captured by each of the line sensors 1a-1 to 1a-4, 1b-1 to 1b-4, and 1c-1 to 1c-4, collectively form a single image of the object when images having the overlapping portion for the object are superposed over each other. The captured images are ordered to provide an image row by adjacently arranging the images that have overlapping portions corresponding to the same portion of the object. The overlapping portion refers to a portion in which the same portion of the object appears in multiple images and the multiple images have duplicate portions. As viewed from one image, the portion that overlaps with that of another image is the overlapping portion.

The line sensor group 1 is divided into three groups. The first group includes line sensors 1a-1 to 1a-4, the second group includes 1b-1 to 1b-4, and the third group includes 1c-1 to 1c-4. Due to this division into groups, the row of images captured by the line sensors 1a-1 to 1a-4, 1b-1 to 1b-4, and 1c-1 to 1c-4 is also divided into groups of images consecutively in order of capturing positions, namely, the images captured by the line sensors 1a-1 to 1a-4, the images captured by the line sensors 1b-1 to 1b-4, and the images captured by the line sensors 1c-1 to 1c-4.

Referring back to FIG. 1, the image-reading apparatus 200 which includes the line sensors 1a-1 to 1a-4, 1b-1 to 1b-4, and 1c-1 to 1c-4, further includes an image-combining apparatus 100 that combines the images taken by the line sensors 1a-1 to 1a-4, 1b-1 to 1b-4, and 1c-1 to 1c-4, respectively. The image-combining apparatus 100 superposes the adjacent images taken by the line sensors 1a-1 to 1a-4, 1b-1 to 1b-4, and 1c-1 to 1c-4 onto each other on the edges where the number of matching pixels is greater than or equal to a prescribed number to combine the row of images taken by the line sensor group 1, thereby creating a single image.

The image-combining apparatus 100 includes multiple A/D converters 2, multiple image processors 7 that perform image processing on digital data signal A/D converted with the A/D converter 2 from the signal that was output from the line sensor group 1, and an image memory 8 for storing image data. The image-combining apparatus 100 further includes an image data transferring path 9 for the sending and receiving image data to and from the image processors 7, a combination-information transferring path 10 for the transferring, between the image processors 7, of combination-information for combining images, and an outputter 15 that outputs synthesized image data.

In the current embodiment, an A/D converter 2a, an image processor 7a, and an image memory 8a are provided for the group of the line sensors 1a-1 to 1a-4. Also, an A/D converter 2b, an image processor 7b, and an image memory 8b are provided for the group of the line sensors 1b-1 to 1b-4. Further, an A/D converter 2c, an image processor 7c, and an image memory 8c are provided for the group of the line sensors 1c-1 to 1c-4.

Also, in the current embodiment, image data transferring paths 9a and 9b are provided as the image data transferring path 9. The image data transferring path 9a is used for the transferring of image data between the image processor 7a and the image processor 7b, whereas the image data transferring path 9b is used for the transferring of data between the image processor 7b and the image processor 7c. Also, combination-information transferring paths 10a and 10b are provided as the combination-information transferring path 10. The combination-information transferring path 10a is used for the sending and receiving of combination-information to and from the image processor 7a and the image processor 7b. The combination-information transferring path 10b is used for the sending and receiving of information to and from the image processor 7b and the image processor 7c.

A/D converters 2a, 2b, and 2c, the image processors 7a, 7b, and 7c, and the image memory 8a, 8b, and 8c, respectively can operate concurrently and independent of each other.

Figure 6:
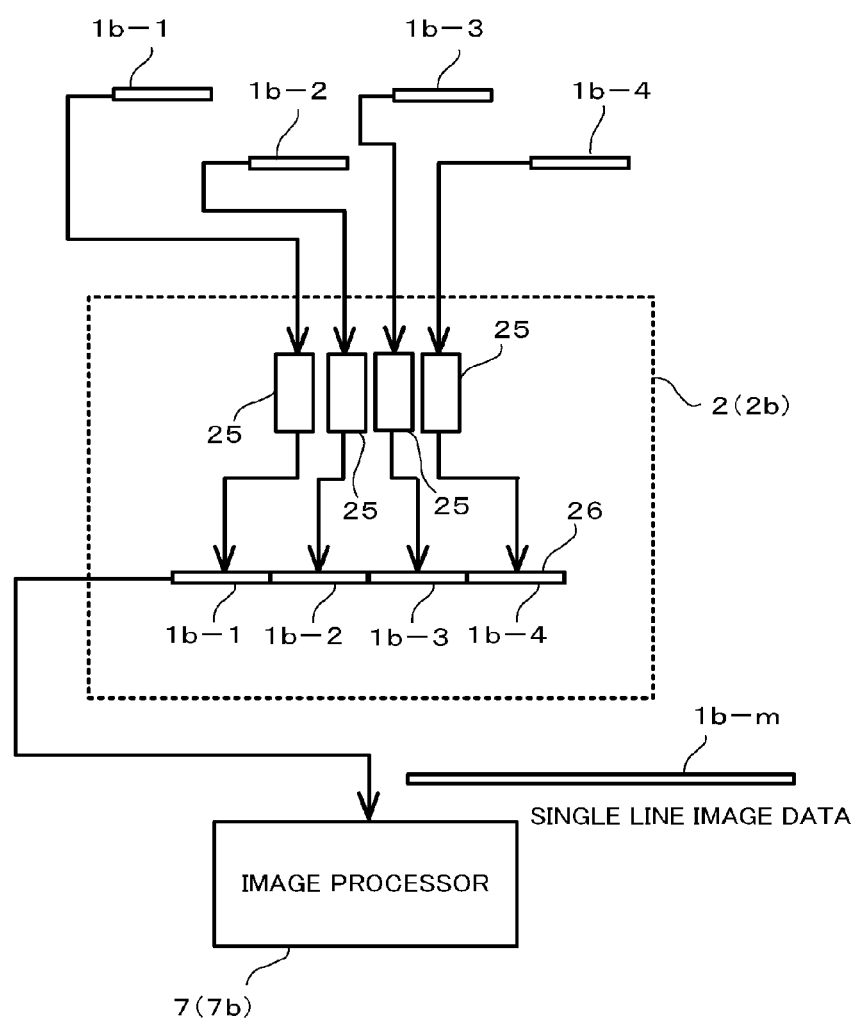
FIG. 6 is a block diagram illustrating a configuration of an A/D converter.

FIG. 6 is a block diagram illustrating a configuration of the A/D converter. As illustrated in FIG. 6, the A/D converter 2b includes four A/D converter units 25 and a buffer 26. The A/D converter 2b receives analog signals output by the line sensors 1b-1, 1b-2, 1b-3, and 1b-4. The four A/D converter units 25 each convert the analog signal received from the corresponding line sensor 1b-1, 1b-2, 1b-3, or 1b-4 into a digital data signal and then outputs the digital data signal. The buffer 26 then receives the four digital data signals output by the four A/D converter units 25. The buffer 26 stores the four digital data signals in a single line. The buffer 26 outputs the digital data signals in the order of the line sensors 1b-1, 1b-2, 1b-3, and 1b-4, that is in the order arranged in the main scanning direction. The A/D converter 2b outputs to image processor 7b the digital data signals that were output by buffer 26, as a single line of image data 1b-m.

The configuration of the A/D converters 2a and 2c are the same as the configuration of the A/D converter 2b. The A/D converter 2a receives the analog signals output by the line sensors 1a-1, 1a-2, 1a-3, and 1a-4, performs the A/D conversion, and then outputs the digital data signal 1a-m. The A/D converter 2c receives the analog signals output by the line sensors 1c-1, 1c-2, 1c-3, and 1c-4, performs the A/D conversion, and then outputs the digital data signal 1c-m.

Referring back to FIG. 1, each image processor 7 (7a, 7b, and 7c), for example, may be realized by a hardware circuit using integrated logic Integrated Circuits (ICs) such as an Application Specific Integrated Circuit (ASIC), a Field Programmable Gate Array (FPGA), or the like. Or, each image processor 7 (7a, 7b, and 7c) may be realized by implementing a software program stored in the memory of a Central Processing Unit (CPU), a Micro Processing Unit (MPU), a Digital Signal Processor (DSP), or the like, that is, each image processor 7 (7a, 7b, and 7c) may be realized by a combination of hardware and software.

The image processors 7 each include a shading corrector 3 that performs shading correction on image data received from the A/D converter 2, a memory controller 4 that controls the reading and writing of image data from and to the image memory 8, a combination-information deriver 5 that reads image data stored in the image memory 8, via the memory controller 4, and then derive combination-information based on the read image data, and an image combiner 6 that combines images based on the combination-information derived by the combination-information deriver 5. The image processor 7a is provided with a shading corrector 3a, a memory controller 4a, a combination-information deriver 5a, and an image combiner 6a. The image processor 7b is provided with a shading corrector 3b, a memory controller 4b, a combination-information deriver 5b, and an image combiner 6b. The image processor 7c is provided with a shading corrector 3c, a memory controller 4c, a combination-information deriver 5c, and an image combiner 6c.

The shading corrector 3 (3a, 3b, and 3c) performs shading correction on any digital data signal received. For example, if the error of the luminance due to the individual characteristics of the image-capturing elements of the line sensors 1a-1 to 1a-4, 1b-1 to 1b-4, and 1c-1 to 1c-4 is reduced and the luminance of the object to be captured is uniform, the shading corrector corrects the digital data signal so as to make entire image have an average uniform luminance.

Figure 7:
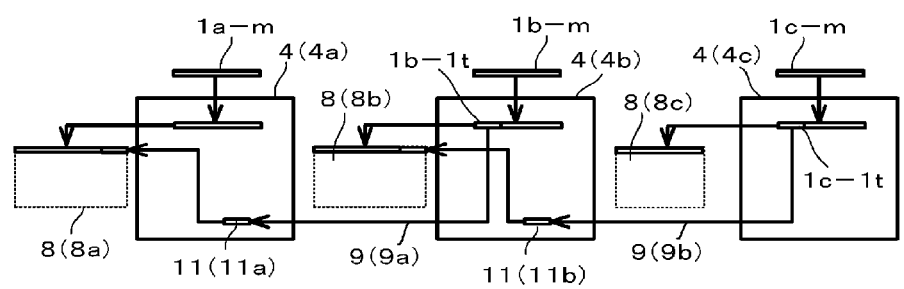
FIG. 7 is a diagram illustrating a configuration of a memory controller in an image-combining apparatus according to an embodiment of the present disclosure.

FIG. 7 is a diagram illustrating a configuration of a memory controller in an image-combining apparatus according to an embodiment of the present disclosure. As illustrated in FIG. 7, the memory controller 4 (4a, 4b, and 4c) stores into the image memory 8 (8a, 8b, and 8c) the digital data signals 1a-m, 1b-m, and 1c-m each time the memory controller 4 (4a, 4b, and 4c) receives the digital data signals 1a-m, 1b-m, and 1c-m.

However, the memory controllers 4a and 4b include an image temporary save memory 11 (11a and 11b). The memory controller 4b transfers the data of the t bits from the head of the received digital data signal 1*b-m*, as data 1*b*-1*t*, to the image temporary save memory 11*a* of the memory controller 4*a*, via the image data transferring path 9*a*, for storage. Likewise, the memory controller 4*c* transfers the data of the t (t refers to a natural number) bit from the head of the received digital data signal 1*c-m*, as data 1*c*-1*t* to the image temporary save memory 11*b* of the memory controller 4*b*, via the image data transferring path 9*b*, for storage. The t bit is a size that is large enough to sufficiently cover the width of overlapping portions between the detection ranges of each of the sensors in the main scanning direction.

The memory controller 4*a* links the digital data 1*b*-1*t* stored in the image temporary save memory 11*a* together with the digital data 1*a-m* stored in the image memory 8*a* to store therein. The memory controller 4*b* links the digital data 1*c*-1*t* stored in the image temporary save memory 11*b* together with the digital data 1*b-m* stored in the image memory 8*b* to store therein.

As illustrated in FIG. 7, each time the memory controller 4*a* receives the digital data 1*a-m*, the memory controller 4*a* sequentially stores digital data in which the front end of digital data 1*b*-1*t* is combined with the rear end of digital data 1*a-m* into the image memory 8*a*. Likewise, each time the memory controller 4*b* receives digital data 1*b-m*, the memory controller 4*b* sequentially stores digital data in which the front end of digital data 1*c*-1*t* is combined with the rear end of digital data 1*b-m* into the image memory 8*b*. Each time the memory controller 4*c* receives digital data 1*c-m* the memory controller 4*c* sequentially stores the digital data 1*c-m* into the image memory 8*c*.

Figure 8:
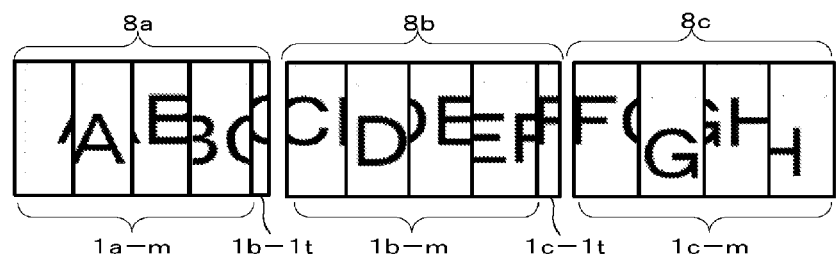
FIG. 8 is a diagram illustrating an example of image data stored in an image memory in the image-combining apparatus according to an embodiment of the present disclosure.

FIG. 8 is a diagram illustrating an example of image data stored in the image memory in the image-combining apparatus according to an embodiment of the present disclosure. As illustrated in FIG. 8, the image formed from digital data 1*a-m* captured by each of the line sensors 1*a*-1 to 1*a*-4 and the image formed from digital data 1*b*-1*t* captured by the front portion of the line sensor 1*b*-1 are stored in the image memory 8*a*. The image formed from digital data 1*b-m* captured by each of the line sensors 1*b*-1 to 1*b*-4 and the image formed from digital data 1*c*-1*t* captured by the front portion of the line sensor 1*c*-1 are stored in the image memory 8*b*. The image formed from the digital data 1*c-m* captured by each of the line sensors 1*c*-1 to 1*c*-4 is stored in the image memory 8*c*.

After the image data taken by the line sensor group 1 is stored in the image memory 8 (8*a*, 8*b*, and 8*c*), the memory controllers 4 (4*a*, 4*b*, and 4*c*), as necessary, reads the image data stored in the image memory 8 (8*a*, 8*b*, and 8*c*) and then outputs the image data to the combination-information deriver 5 (5*a*, 5*b*, and 5*c*) or the image combiner 6 (6*a*, 6*b*, and 6*c*). The memory controller 4 (4*a*, 4*b*, and 4*c*) also can read and output a portion of the image data stored in the image memory 8 (8*a*, 8*b*, and 8*c*).

Referring back to FIG. 1, the combination-information derivers 5*a*, 5*b*, and 5*c* derive combination-information for combining together the images stored in the image memory 8*a*, the images stored in image memory 8*b*, and the images stored in image memory 8*c*, without any positional displacement and without any luminance discrepancies.

As previously described, the line sensors 1*a*-1 to 1*a*-4, 1*b*-1 to 1*b*-4, and 1*c*-1 to 1*c*-4 are disposed in a staggered pattern in the main scanning direction and the detection ranges of the line sensors partially overlap with each other as viewed in the sub-scanning direction. Therefore, the position of the image taken by each line sensor 1*a*-1 to 1*a*-4, 1*b*-1 to 1*b*-4, and 1*c*-1 to 1*c*-4 is displaced with the adjacent images in the sub-scanning direction, and regions exist in which the edges shared by the images in the main scanning direction have a number of matching pixels that is greater than or equal to a prescribed number. In this embodiment, images are combined by shifting one of the adjacent images in the sub-scanning direction and superposing these regions in the main scanning direction. The region, in which the number of matching pixels is greater than or equal to a prescribed number on the edges of the images in the main scanning direction, is an overlapping portion in an image; the overlapping portion being the portion that overlaps with another image.

Figure 9:
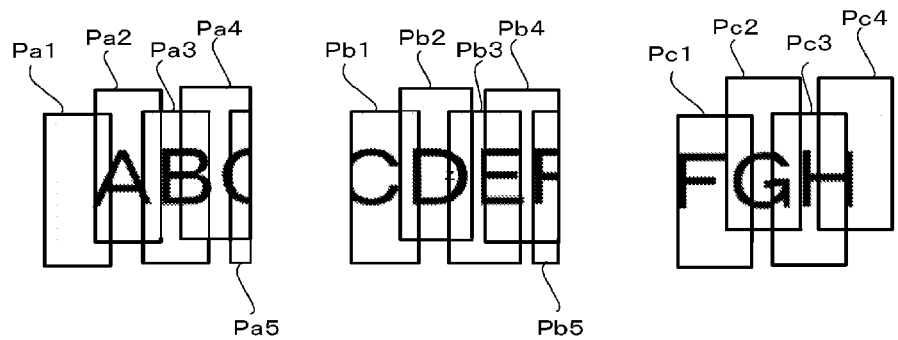
FIG. 9 is a diagram illustrating how images are combined together.

FIG. 9 is diagram illustrating how images are combined together. The images captured by the line sensors 1*a*-1, 1*a*-2, 1*a*-3, and 1*a*-4 are respectively referred to as images Pa1, Pa2, Pa3, and Pa4. Also, the images captured by the line sensors 1*b*-1, 1*b*-2, 1*b*-3, and 1*b*-4 are respectively referred to as images Pb1, Pb2, Pb3, and Pb4. Furthermore, the images captured by the line sensors 1*c*-1, 1*c*-2, 1*c*-3, and 1*c*-4 are respectively referred to as images Pc1, Pc2, Pc3, and Pc4.

A partial image of image Pb1 stored in the image memory 8*a* is referred to as image Pa5. This image Pa5 is an image that is formed by the digital data 1*b*-1*t*. Image Pa5 is image data used for performing image-matching between image Pa4 and image Pb1 which is in a group different from image Pa4. After image Pa5 is transferred, via the image data transferring path 9*a*, and stored in the image temporary save memory 11*a* of the memory controller 4*a*, the memory controller 4*a* stores image Pa5 into the image memory 8*a*. Also, a partial image of image Pc1 stored in the image memory 8*b* is referred to as Pb5. This image Pb5 is an image formed by the digital data 1*c*-1*t*. Image Pb5 is image data used for performing image-matching between image Pb4 and image Pc1 which is in a group different from image Pb4. After image Pb5 is transferred, via the image data transferring path 9*b*, and stored into the image temporary save memory 11*b* of the memory controller 4*b*, the memory controller 4*b* stores image Pb5 into the image memory 8*b*.

The memory controller 4*a* may reference the image memory 8*b* to acquire image Pa5 and the memory controller 4*b* may reference the image memory 8*c* to acquire image Pb5. When doing so, the image data transferring paths 9*a* and 9*b* are unnecessary.

Referring back to FIG. 1, the combination-information deriver 5*a* derives combination-information through use of image-matching for combining the images adjacent to each other among images Pa1 to Pa4 belonging to the corresponding group (a first image and a second image of the group) and image Pa5 (the second image adjacent to the first image and belongs to a different group), without any positional displacement and without any luminance discrepancies. The combination-information deriver 5*b* derives combination-information through use of image-matching for combining the images adjacent to each other among images Pb1 to Pb4 belonging to the corresponding group (a first image and a second image of the group) and image Pb5 (the second image belonging to another group and adjacent to the first image), without any positional displacement and without any luminance discrepancies. The combination-information deriver 5*c* derives combination-information through use of image-matching for combining the images adjacent to each other among images Pc1 to Pc4 belonging to the respective group (a first image and a second image of the group), without any positional displacement and without any luminance discrepancies. The second image, which is image-matched against the first image, is the image whose order in the row of images is adjacent to the first image. The second image includes a portion that belongs to the same group as the first image and a portion that belongs to a group different from the first image.

Figure 10:
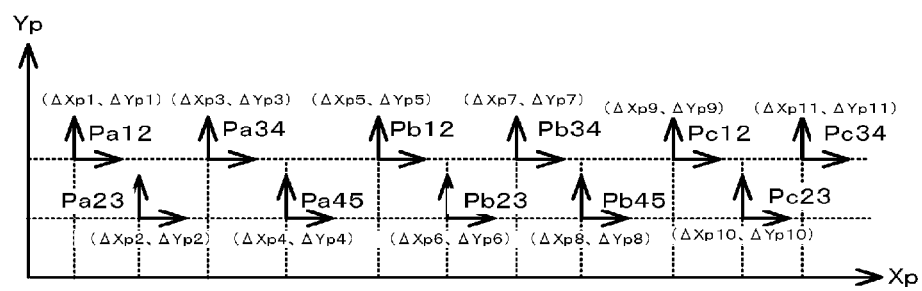
FIG. 10 is a diagram illustrating an absolute coordinate system defined by a combined image in which the images are finally combined together.

In the current embodiment, all of the images are finally combined together into a single image, a unified absolute coordinate system for arranging each of the images is necessary. FIG. 10 is a diagram illustrating an absolute coordinate system defined by a combined image in which the images are finally combined together. FIG. 10 illustrates combining position Pa12 being designed, where image Pa1 and image Pa2 are superposed over each other. The combination-information deriver 5a derives, as combination-information, the positional displacement amount ($\Delta$Xp1, $\Delta$Yp1) of the combining position of position image Pa1 and image Pa2 from this position Pa12. FIG. 10 illustrates combining position Pa23 being designed, where image Pa2 and image Pa3 are superposed over each other. FIG. 10 also illustrates combining position Pa34 being designed, where image Pa3 and image Pa4 are superposed over each other, and combining position Pa45 being designed, where image Pa4 and image Pa5 are superposed over each other. Combination-information deriver 5a derives, as combination-information (combining position information), the positional displacement amounts ($\Delta$Xp2, $\Delta$Yp2), ($\Delta$Xp3, $\Delta$Yp3), and ($\Delta$Xp4, $\Delta$Yp4) of these combining positions.

Likewise, as illustrated in FIG. 10, the combining positions, serving as references in design, where images Pb1 and Pb2, images Pb2 and Pb3, images Pb3 and Pb4, and images Pb4 and Pb5 are superposed over each other, are respectively referred to as combining positions Pb12, Pb23, Pb34, and Pb45. The combination-information deriver 5b derives, as combination-information (combining position information), the positional displacement amounts ($\Delta$Xp5, $\Delta$Yp5), ($\Delta$Xp6, $\Delta$Yp6), ($\Delta$Xp7, $\Delta$Yp7), and ($\Delta$Xp8, $\Delta$Yp8) of the superposing positions with respect to combining positions Pb12, Pb23, Pb34, and Pb45. Also, as illustrated in FIG. 10, the combining positions, serving as references in design, where images Pc1 and Pc2, images Pc2 and Pc3, and images Pc3 and PC4 are superposed over each other, are respectively referred to as Pc12 Pc23, and Pc34. The combination-information deriver 5c derives, as combination-information (combining position information), the positional displacement amounts ($\Delta$Xp9, $\Delta$Xp9), ($\Delta$Xp10, $\Delta$Xp10), and ($\Delta$Xp11, $\Delta$Xp11) of the superposing positions with respect to combining positions Pc12, Pc23, and Pc34.

Figure 11:
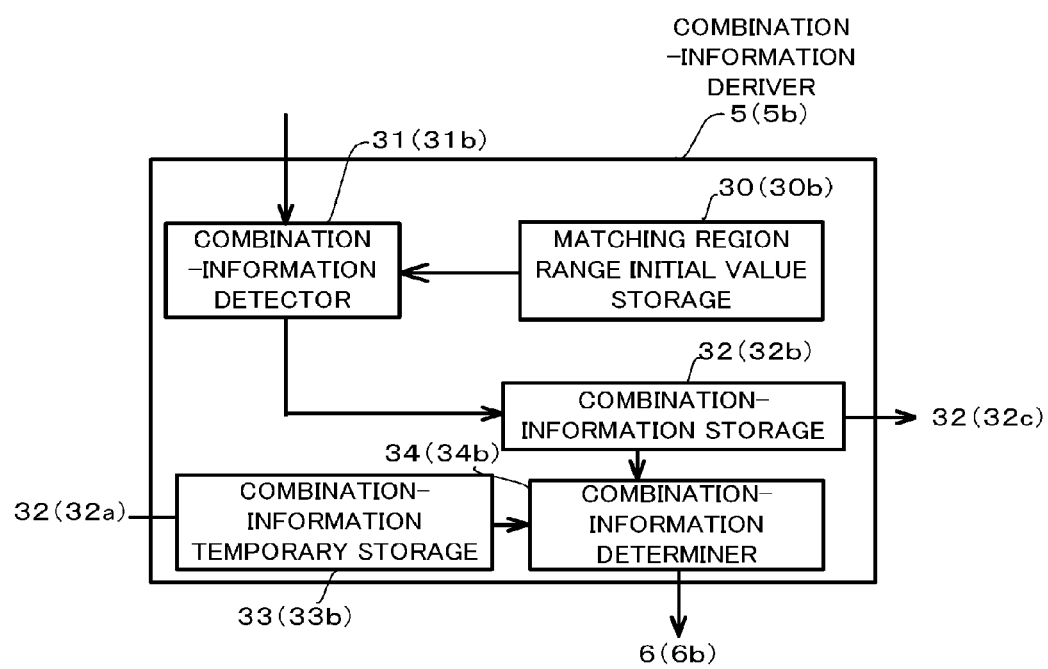
FIG. 11 is a block diagram illustrating a configuration of a combination-information deriver in the image-combining apparatus according to an embodiment of the present disclosure.

FIG. 11 is a block diagram illustrating a configuration of a combination-information deriver in the image-combining apparatus according to an embodiment of the present disclosure. As illustrating in FIG. 11, the combination-information deriver 5 (5b) includes a matching region range initial value storage 30 (30b), a combination-information detector 31 (31b), a combination-information storage 32 (32b), a combination-information temporary storage 33 (33b), and a combination-information determiner 34 (34b).

The matching region range initial value storage 30 (30b) stores the previously described combining positions Pb12, Pb23, Pb34, and Pb45 for the above-mentioned superimposition in design, and an initial value of a range in which image-matching is performed with position coordinates as a center.

The combination-information detector 31 (31b) reads the image data within and peripheral to the overlapping regions in the adjacent images from the image memory 8b, via the memory controller 4b. The combination-information detector 31 (31b) reads the combining positions Pb12, Pb23, Pb34, Pb45 being designed and the matching region ranges, from the matching region range initial value storage 30 (30b) and performs image-matching using the images within and peripheral to the overlapping regions read by the image memory 8b.

In performing this image-matching, the combination-information detector 31 (31b) detects the optimal solution combining-position information in which the degree of correlation of the two images is the highest. Specifically, the combination-information detector 31 (31b) uses combining positions Pb12 to Pb45 as design references to detect the positional displacement amounts ($\Delta$Xp5, $\Delta$Xp5) to ($\Delta$Xp8, $\Delta$Yp8) having the highest degree of correlation of image-matching as the combining-position information.

Figure 12:
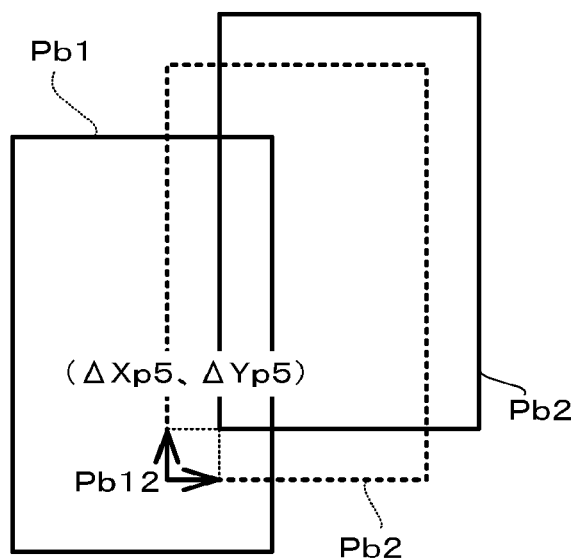
FIG. 12 is a diagram illustrating how image-matching is performed between two images.

FIG. 12 is a diagram illustrating how image-matching is performed between two images. In FIG. 12, image Pb2 in combining position Pb12 being designed with respect to image Pb1 is depicted by a dotted line. By image-matching, image Pb2 in the optimal solution position having the highest degree of correlation with image Pb1 is depicted by a solid line. In this case, the displacement between image Pb2 (dotted line) and image Pb2 (solid line) is obtained as the positional displacement amount ($\Delta$Xp5, $\Delta$Yp5).

Here, when any image included in the overlapping region is an image that contains a solid or repeating pattern, sometimes multiple optimal solutions are obtained by image-matching. In such a case, there is a higher probability that the to-be-detected positional displacement amounts ($\Delta$Xp5, $\Delta$Yp5) to ($\Delta$Xp8, $\Delta$Yp8) will be erroneously detected. Therefore, in addition to combining positions obtained as multiple optimal solutions, the combination-information detector 31 (31b) detects the accuracy level of the combining positions. For example, when multiple solutions k (k refers a natural number) exist, the accuracy level may be calculated as 1/k. The calculated accuracy level is associated together with the combining-position information and then stored in the combination-information storage 32 (32b) as combination-information.

Also, when the images Pb1 to Pb5 are superposed over each other using the positional displacement amounts ($\Delta$Xp5, $\Delta$Yp5) to ($\Delta$Xp8, $\Delta$Yp8) as main combining-position information, the combination-information detector 31 (31b) obtains the average level of luminance of the pixels inside the specified range where the images superpose with each other and then calculates the difference in the average level of luminance between the two images as luminance difference information. The combination-information detector 31 (31b) stores into the combination-information storage 32 (32b), the calculated luminance difference information as the combination-information.

In such a way, the combination-information detector 31 (31b) detects the combining-position information, the level of accuracy of the combining-position information, and the luminance difference information, and then stores this detected information into the combination-information storage 32 (32b) as combination-information.

When image displacement only occurs in the sub-scanning direction, image-matching in just the sub-scanning direction is sufficient for detection of the positional displacement amount in only the sub-scanning direction.

Figure 13:
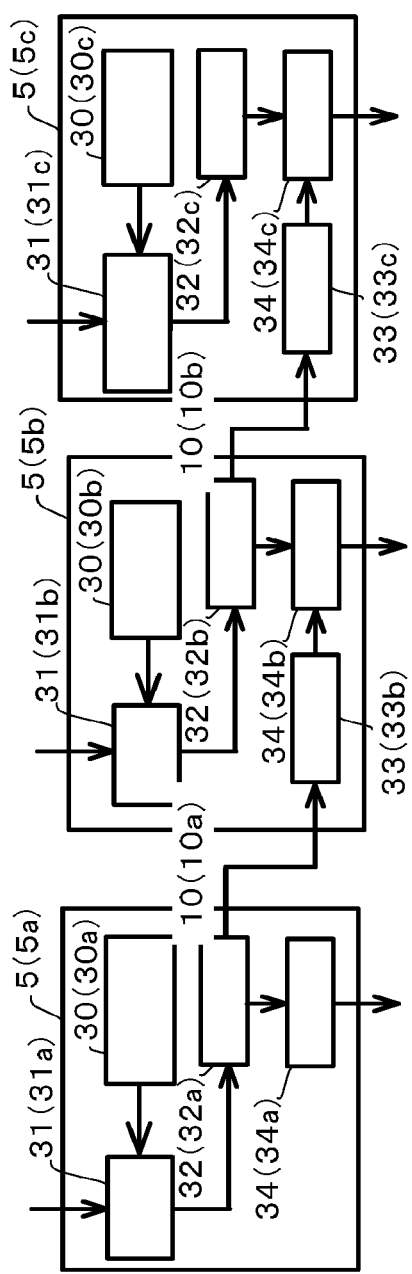
FIG. 13 is a block diagram illustrating an overall configuration of the combination-information deriver.

FIG. 13 is a block diagram illustrating an overall configuration of the combination-information deriver. As illustrated in FIG. 13, the combination-information derivers 5a and 5c operate in almost the same manner as the combination-information deriver 5b. In the combination-information deriver 5a, the combination-information detector 31 (31a) reads image Pa1 to image Pa5 from the image memory 8a, via the memory controller 4a and furthermore reads combining positions Pa12, Pa23, Pa34, and Pa45 being designed and the matching region range from the matching region range initial value storage 30 (30a). Then, the combination-information detector 31 (31a) performs image-matching within and peripheral to the overlapping region in the adjacent images read from the image memory 8a. By doing so, the positional displacement amounts ($\Delta$Xp1, $\Delta$Yp1) to ($\Delta$Xp4, $\Delta$Yp4) are detected as combining-position information and furthermore, the accuracy level of the combining-position information and the luminance difference information are detected. This combination-information is stored into the combination-information storage 32 (32a).

Also, in the combination-information deriver 5c, the combination-information detector 31 (31c) performs reading from the image memory 8c via the memory controller 4c, and reads the combining positions Pc12, Pc23, Pc34 being designed and the matching region range from the matching region range initial value storage 30 (30c), and performs image-matching within and peripheral to the overlapping region in the adjacent images read from the image memory 8c. By doing so, the positional displacement amounts ($\Delta$Xp9, $\Delta$Xp9) to ($\Delta$Xp11, $\Delta$Xp11) are detected as combining-position information and furthermore, the accuracy level of the combining position and the luminance difference information are detected. This combination-information is stored into the combination-information storage 32 (32c).

As illustrated in FIG. 13, the combination-information between image Pa4 (first image) and image Pa5 (second image belonging to a group that is different from the first image) among the combination-information stored in the combination-information storage 32 (32a) is sent, via the combination-information transferring path 10a, to the combination-information temporary storage 33 (33b) of the image processor 7b and stored. Also, the combination-information between image Pb4 (first image) and image Pb5 (second image belonging to a group that is different from the first image) among the combination-information stored in the combination-information storage 32 (32a) is sent, via a combination-information transferring path 10b, to the combination-information temporary storage 33 (33c) of the image processor 7c and then stored.

Figure 14:
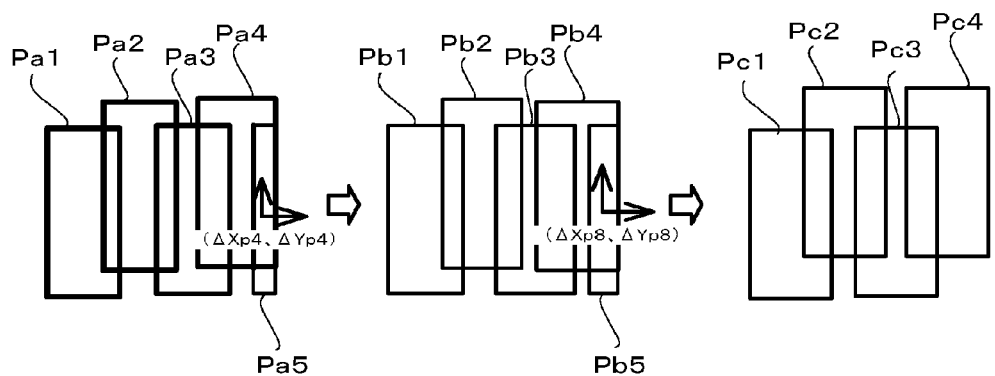
FIG. 14 is a diagram illustrating the combining of images across different groups.

FIG. 14 is a diagram illustrating the combining of images across different groups. As illustrated in FIG. 14, the positional displacement amount ($\Delta$Xp4, $\Delta$Yp4) between image Pa4 and image Pa5 becomes the positional displacement amount between image Pa4 and image Pb1. Therefore, as described above, the combination-information deriver 5 (5a) sends the positional displacement amount ($\Delta$Xp4, $\Delta$Yp4) between image Pa4 and image Pa5, via the combination-information transferring path 10a, to the combination-information temporary storage 33 (33b) of the combination-information deriver 5 (5b) and stored. Also, the positional displacement amount ($\Delta$Xp8, $\Delta$Yp8) between image Pb4 and image Pb5 becomes the positional displacement amount between image Pb4 and image Pc1. Therefore, the combination-information deriver 5 (5b) sends the positional displacement amount ($\Delta$Xp8, $\Delta$Yp8) between image Pb4 and image Pb5 to the combination-information temporary storage 33 (33c) of the combination-information deriver 5 (5c).

The combination-information determiner 34 (34b) determines the combining-position information and the luminance difference information of images Pb1 to Pb4 based on the combination-information of the images stored in the combination-information storage 32 (32b) and the combination-information stored in the combination-information temporary storage 33 (33b). For example, when the combining position (positional displacement amount) of a particular adjacent images that were detected is statistically greatly different compared to the combining position (positional displacement amount) of other adjacent images, the combination-information determiner 34 (34b) does not use that combination-information and instead determines the combining position based on the average value of the combining position (positional displacement amounts) of the other images. Also, when there are more than one combining position that is the optimal solution of the adjacent images is obtained and the accuracy level is low (less than 0.5, for example), the combination-information determiner 34 (34b) does not use that combination-information and instead determines the combining position and the luminance difference based on the average value of the combination-information of the other images that are adjacent to each other.

That is, when the image-matching of the adjacent images cannot narrow the combination-information to a single optimal combining-position information, the combination-information determiner 34 (34b) determines the combining-position information between the adjacent images based on the average value of the combining-position information of the image-matching of the other images.

Figure 15:
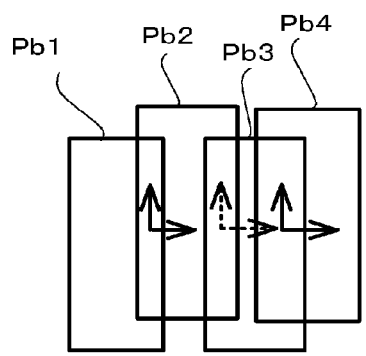
FIG. 15 is a diagram illustrating an example of combining-position information between adjacent images being obtained based on an average value of the combining-position information of other adjacent images.

FIG. 15 is a diagram illustrating an example of combining-position information between adjacent images being obtained based on an average value of the combining-position information of other adjacent images. As illustrated in FIG. 15 by way of example, when multiple combining positions are derived by image-matching between image Pb2 and image Pb3, the average value of the positional displacement amount obtained between image Pb1 and image Pb2 (double-arrow solid line) and the positional displacement amount obtained between image Pb3 and image Pb4 (double-arrow solid line) may be adopted as the positional displacement amount between image Pb2 and image Pb3. In this way, the impact of the erroneously detected combination-information in the embodiment can be kept to a minimum.

The combination-information between image Pa4 and image Pa5 sent from the combination-information storage 32 (32a) of the image processor 7a is stored in the combination-information temporary storage 33 (33b). Therefore, the combination-information determiner 34 (34b) receives the combination-information sent from image processor 7a, and determines the combination-information between the images adjacent across groups in the same way that adjacent images within the same group are combined. All of the determined combination-information is output to the image combiner 6b.

The image combiner 6 (6a) reads images Pa1 to Pa4 of the corresponding group from the image memory 8 (8a) via the memory controller 4 (4a), corrects the luminance for each of the images Pa1 to Pa4 based on the luminance difference information determined by the combination-information determiner 34 (34a), and combines the images together based on the determined combining-position information. The luminance correction is performed using image Pa1 as the reference, for example. The combining of images is performed on an absolute coordinate system (Xp, Yp). The image combiner 6a outputs the combined image data to the outputter 15.

The image combiner 6 (6b) reads images Pb1 to Pb4 of the corresponding group from the image memory 8 (8b) via the memory controller 4 (4b), corrects the luminance for each of the images Pb1 to Pb4 based on the luminance difference information determined by the combination-information determiner 34 (34b), and combines images Pb1 to Pb4 together based on the combining positions. The luminance correction is performed using image Pb1 (Pa5) with the luminance corrected by the luminance difference between image Pa4. The image combiner 6b outputs the combined image data to the outputter 15.

The image combiner 6 (6c) reads images Pc1 to Pc4 of the corresponding group from the image memory 8 (8c) via the memory controller 4 (4c), corrects the luminance for each of the images Pc1 to Pc4 based on the luminance difference information determined by the combination-information determiner 34 (34c), and combines images Pc1 to Pc4 together based on the combining positions. The luminance correction is performed using image Pc1 (Pb5) with the luminance corrected by the luminance difference between image Pb4 as reference. The image combiner 6c outputs the combined image data to the outputter 15.

The outputter 15, for example, includes an image memory 15M (refer to FIG. 1) defined in the absolute coordinate system (Xp, Yp) in FIG. 10, and outputs to a display the image set in the image memory 15M. The combined image data individually output by the image combiners 6a, 6b, and 6c are set in the respective position coordinates in the absolute coordinate system (Xp, Yp) as determined at the time of combining.

Figure 16:
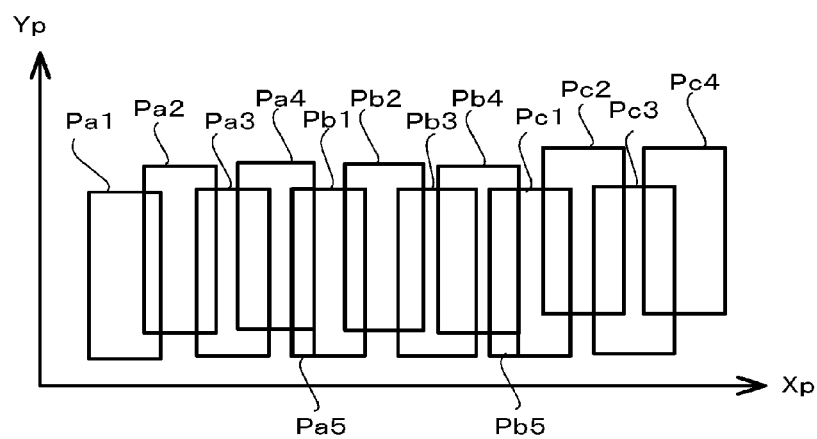
FIG. 16 is a diagram illustrating how image data output from the image combiner is set in the absolute coordinate system in the image memory of an outputter.

FIG. 16 is a diagram illustrating how image data output from the image combiner is set in the absolute coordinate system in the image memory 15M of the outputter. As illustrated in FIG. 16, images Pa1 to Pa4, images Pb1 to Pb4, images Pc1 to Pc4, all combined together, are set in the image memory 15M. No positional displacement occurs between images Pa1 to Pa4, images Pb1 to Pb4, and images Pc1 to Pc4 as positional displacement is taken into account for all of the images at the time of combining in the image combiners 6a, 6b, and 6c. Moreover, no unnatural luminance discrepancies occur in images Pa1 to Pa4, images Pb1 to Pb4, and images Pc1 to Pc4 in the image combiners 6a, 6b, and 6c as all luminance discrepancies are taken into account and all differences in luminance are corrected. Therefore, the combined image in which all of the images are combined together is output by the outputter 15 to a display, for example.

Figure 17:
FIG. 17 is a diagram illustrating an example of an image output by the outputter.

FIG. 17 is a diagram illustrating an example of an image output by the outputter. As illustrated in FIG. 17, combined image 22 output by the outputter 15 is a combination of images without any positional displacement and without any luminance discrepancies, and therefore corresponds well with the paper document illustrated in FIG. 3.

Figure 18:
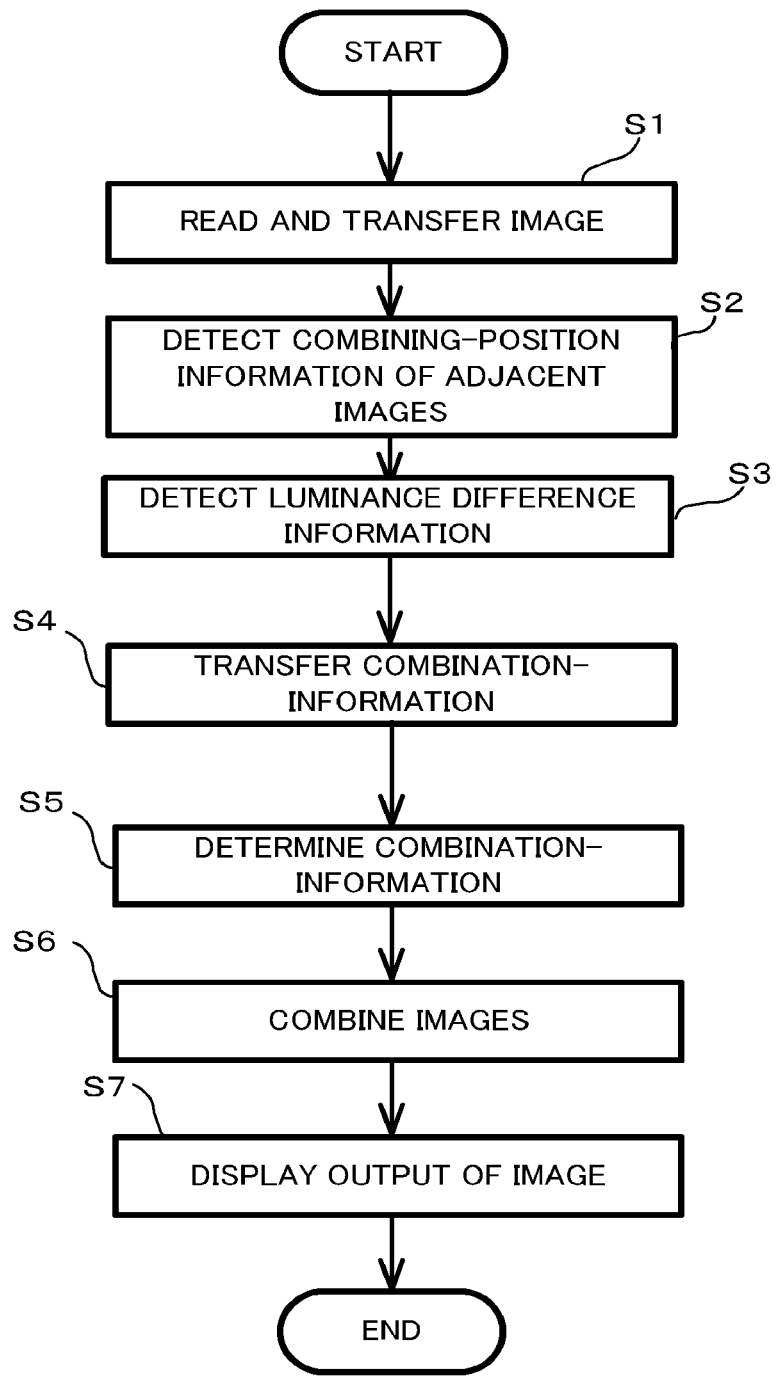
FIG. 18 is a flowchart illustrating an operation of the image-combining apparatus.

Hereinafter, the operation of the image-combining apparatus 100 is described according to the current embodiment. FIG. 18 is a flowchart illustrating the operation of the image-combining apparatus.

As illustrated in FIG. 18, first the memory controller 4 (4a, 4b, and 4c) perform image reading and transferring (step S1). The digital data 1a-m, 1b-m, and 1c-m that were captured by the line sensor group 1 and A/D converted by the A/D converter 2 (2a, 2b, and 2c) are written into the image memory 8 (8a, 8b, and 8c) by the memory controller 4 (4a, 4b, and 4c). At the same time, the digital data 1b-1t and 1c-1t are transferred from the memory controllers 4b and 4c, via the image data transferring path 9 (9a and 9b), to the memory controllers 4a and 4b, and written to image memory 8a and 8b, respectively.

Figure 19:
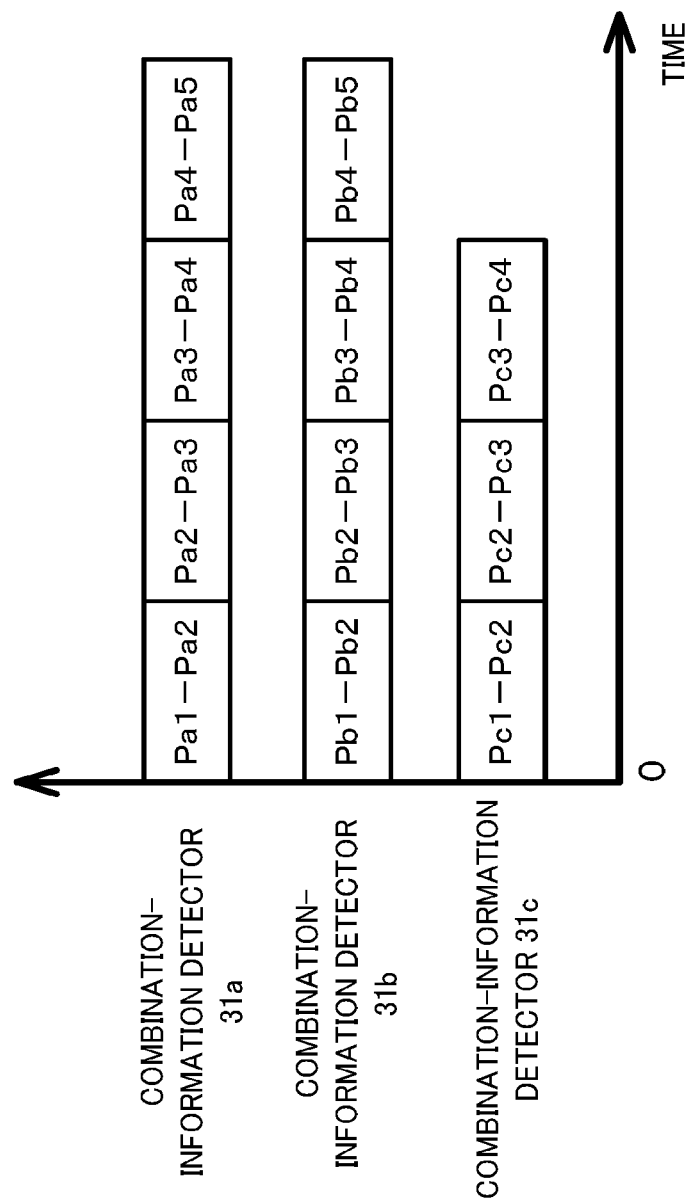
FIG. 19 is a timing chart of image-matching processing performed by the combination-information deriver.

Next, the combination-information detector 31 (31a, 31b, and 31c) of the combination-information deriver 5 (5a, 5b, and 5c) detects the combining-position information (positional displacement amount) of adjacent images by performing image-matching (step S2). FIG. 19 is a timing chart of image-matching processing performed by the combination-information deriver. As illustrated in FIG. 19, since the three combination-information detectors 31a, 31b, and 31c perform image-matching concurrently and detect combining-position information of the images related to each group, the time taken to detect combining-position information can be substantially reduced compared to the time taken to perform image-matching on all of the adjacent images by a single image processor.

Referring back to FIG. 18, next the combination-information deriver 5 (combination-information detector 31) detects luminance difference information of the adjacent images within a predetermined range in which the detected combining positions are at the center (step S3).

Next, the combination-information deriver 5a transfers the detected combination-information along the combination-information transferring path 10a to the combination-information temporary storage 33b of the combination-information deriver 5b, and the combination-information deriver 5b transfers the detected combination-information along the combination-information transferring path 10b to the combination-information temporary storage 33c of the combination-information deriver 5c (step S4).

Next, the combination-information determiner 34 (34a, 34b, and 34c) determines the combination-information based on the combination-information stored in combination-information storage 32 (32a, 32b, and 32c) and, if present, the combination-information stored in combination-information temporary storage 33 (33b and 33c) (step S5). Here, for example, in step S2, when multiple optimal solution combining positions are detected between images or when an optimal solution cannot be obtained, the combining position between images is determined based on an average value of the combining positions detected between other images.

Next, image combiner 6 (6a, 6b, and 6c) combines together images Pa1 to Pa4, images Pb1 to Pb4, and images Pc1 to Pc4 based on the combination-information determined by the combination-information determiner 34 (34a, 34b, and 34c) (step S6). Here, the images are arranged and combined together in accordance with the absolute coordinate system (Xp, Yp) within which all of the images are synthesized together.

Next, the outputter 15 inputs images Pa1 to Pa4, images Pb1 to Pb4, and images Pc1 to Pc4 output from the image combiner 6 (6a, 6b, and 6c) into the image memory 15M and outputs all of the images as the combined image to a display (step S7).

As described in detail above, according to the current embodiment, the row of images captured by the line sensor group 1 are divided into groups of images Pa1 to Pa4, Pb1 to Pb4, and Pc1 to Pc4, the order of which is continuous when images respectively having overlapping portions corresponding to the same portion of a subject are arranged so as to be adjacent to each other, and the combining-position information of images Pa1 to Pa4 within the same group and Pa2 to Pa5 of the second image adjacent to the group are detected concurrently by each group, thus the time taken to detect the combining-position information of these images can be reduced. Also, the image data used for image-matching between adjacent images Pa4 and Pb1 that belongs to a group different from Pa4 and also between adjacent images Pb4 and Pc1 that belongs to a group different from Pb4 is transferred via image data transferring paths 9a and 9b between the image processors 7a and 7b and between image processors 7b and 7c, respectively. By doing so, the combining-position information between image Pa4 and image Pb1 (Pa5) that is adjacent to Pa4 and belongs to a different group, and between image Pb4 and image Pc1 (Pb5) that is adjacent to image Pb4 and belongs to a different group are detectable by only the image processors 7a and 7b. Also, the combining-position information between images Pa4 and Pb4 and images Pb1 and Pc1 that are respectively adjacent to the images Pa4 and Pb4 and belong in different groups are sent and received to and from image processors 7a and 7b and the image processors 7b and 7c, via the combination-information transferring paths 10a and 10b, respectively. By doing so, the image processors 7a, 7b, and 7c can each combine the images belonging to the corresponding groups together in state in which there is no positional displacement, while taking into account positional displacement between images and an image belonging to another group (while correcting the position of image Pb1 by just using, for example, the positional displacement amount or the like between image Pa4 and image Pa5). As a result, the row of images can be combined together quickly. Taking into account positional displacement between images and an image belonging to another group means that combining is performed in a state where there is no positional displacement the images and the image belonging to another group. Taking into account luminance discrepancies between images and an image belonging to another group means that combining is performed in a state where there are no luminance discrepancies between the images and an image belonging to another group.

For example, as in the current embodiment, if the row of images is divided into three groups and there are three image processors 7a, 7b, and 7c, the time necessary to perform processing to combine the images can be reduced by approximately one-third the time, as illustrated in FIG. 19.

In the above-described embodiments, there are twelve line sensors, one being the line sensor 1a-1 and the like, and the number of the line sensor 1a-1 and the like included in the group of the line sensor 1a-1 and the like is four, but the present disclosure is not limited to this. Having four or more line sensors such as line sensor 1a-1 and the like is sufficient. Also, having two or more line sensors, such as line sensor 1a-1 and the like included in a group, as the number of line sensors, is sufficient. Even if the number of line sensors, such as line sensor 1a-1 and the like, is increased, as long as the number of groups is increased, the time necessary to perform processing to combine the images can be reduced.

The line sensor group 1 does not have to be arranged in a staggered pattern. For example, the line sensor group 1 can be arranged in three or more rows. Also, the line sensors, such as line sensor 1a-1 and the like, do not have to be equal in length. It is sufficient for the image-reading apparatus 200 to have image-capturing elements that can capture a row of images in which a plurality of images are arranged in the order of the capturing position of the object, and at edges shared by images that have the closest capturing positions, more than or equal to a prescribed number of pixels are the same. In this sense, two-dimensional image-capturing elements may be included instead of line sensor 1a-1 and the like.

In addition, the hardware or software configurations of the image processor 7 (7a, 7b, and 7c) is merely an example and may be freely changed or corrected.

For example, the image temporary save memory 11a and 11b may be arranged outside of the memory controllers 4a and 4b. Also, the image memory 8a, 8b, and 8c may be arranged inside of the image processors 7a, 7b, and 7c.

Also, in the above-described embodiments, image data is transferred via the image data transferring paths 9a and 9b from the image processors 7b and 7c to the image processor 7a and 7b respectively, then image-matching is performed on the adjacent images across groups by the image processors 7a and 7b, combination-information is detected, and then the detected combination-information is transferred from the image processors 7a and 7b, via the combination-information transferring path 10a and 10b to the image processors 7b and 7c, respectively. However, the image data instead may be transferred from the image processors 7a and 7b to image processors 7b and 7c, respectively, image-matching may be performed on the adjacent images across groups by the image processors 7b and 7c, respectively, to detect the combination-information, and then the combination-information may be transferred from the image processors 7b and 7c to the image processors 7a and 7b, respectively.

The image processor 7 (7a, 7b, and 7c), not needing a dedicated system, can be accomplished by using a normal computer system. For example, a program that causes a computer to execute the above-described operations may be distributed in a manner stored in a non-transitory computer readable recording medium (for example, a flexible disk, CD-ROM, DVD-ROM, and the like) and the image processor 7 (7a, 7b, and 7c) that executes the above-described processes may be formed by installing the program in the computer system. In addition, the computer program may be stored in a storage device of a server device on a communication network such as the Internet, and the image processor 7 (7a, 7b, and 7c) may be formed by a normal computer system by downloading and the like the computer program.

When the function of the image processor 7 (7a, 7b, and 7c) is accomplished by sharing or by cooperating between an OS (an operating system) and an application program, optionally only the application program portion is stored in a recording medium or a storage device.

In addition, the computer program may be superimposed onto a carrier wave and delivered via a communication network. As an example, the computer program may be posted on a bulletin board (BBS, Bulletin Board System) on a communication network to deliver the computer program via the network. Then, this computer program may be started and executed in a manner similar to other application programs under the control of the OS to execute the aforementioned processes.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2015-080093, filed on Apr. 9, 2015, the entire disclosure of which is incorporated by reference herein.

INDUSTRIAL APPLICABILITY

The present disclosure can be utilized, for example, in image-combining apparatus and the like that combine together, in a continuous manner, adjacent images that partially overlap with each other.

REFERENCE SIGNS LIST

1 Line sensor group
1a-1 to 1a-4 Line sensors
1b-1 to 1b-4 Line sensors
1c-1 to 1c-4 Line sensors
2, 2a, 2b, 2c A/D converter
3, 3a, 3b, 3c Shading corrector
4, 4a, 4b, 4c Memory controller
5, 5a, 5b, 5c Combination-information deriver
6, 6a, 6b, 6c Image combiner
7, 7a, 7b, 7c Image processor
8, 8a, 8b, 8c Image memory
9, 9a, 9b, 9c Image data transferring path
10, 10a, 10b Combination-information transferring path
11, 11a, 11b Image temporary save memory
15 Outputter
15M Image memory
20 Paper document
21 Image
22 Combined image
25 A/D converter unit
26 Buffer
30, 30a, 30b, 30c Matching region range initial value storage
31, 31a, 31b, 31c Combination-information detector
32, 32a, 32b, 32c Combination-information storage
33, 33b, 33c Combination-information temporary storage
34, 34a, 34b, 34c Combination-information determiner
40 Scan driver
50 Substrate
100 Image-combining apparatus
200 Image-reading apparatus

The invention claimed is:

1. An image-combining apparatus, comprising:
a plurality of image processors provided for respective groups of images formed by grouping of the images in an image row into sequentially ordered images, each image in the image row having an overlapping portion that is a portion overlapping with a portion of another image, the image row having adjacent images that have the overlapping portions corresponding to a same portion of an object, the plurality of image processors concurrently performing processing to detect, by image-matching, combining-position information for combining a first image within one group and a second image in a position that is adjacent to the first image in the image row without any positional displacement;
an image data transferring path to transfer an image of the overlapping portion of the second image belonging to a group different from the first image to the image processor that processes the first image having an overlapping portion corresponding to the same portion of the object, the image of the overlapping portion of the second image being a head of the images of a group corresponding to each image processor of the plurality of image processors; and
a combination-information transferring path to transfer, between the plurality of image processors, combining-position information between the first image and the second image belonging to a group different from the first image,
wherein each image processor of the plurality of image processors combines, based on the combining-position information self-detected and the combining-position information transferred via the combination-information transferring path, the images belonging to the corresponding group without any positional displacement while combining the images belonging to the corresponding group with an image belonging to another group without any positional displacement between adjacent images across different groups.

2. The image-combining apparatus according to claim 1, wherein each image processor of the plurality of image processors concurrently performs processing to detect a luminance difference information when the first image and the second image are superposed over each other based on the combining-position information detected between the first image and the second image,
wherein the combination-information transferring path transfers, between the image processors, the luminance difference information between the first image and the second image belonging to the group different from the first image, and
wherein each image processor of the plurality of image processors combines, based on the luminance difference information self-detected and the luminance difference information that is received via the combination-information transferring path, the images belonging to the corresponding group without any luminance discrepancy while combining the images belonging to the corresponding group with an image belonging to another group without any luminance discrepancy between adjacent images across different groups.

3. The image-combining apparatus according to claim 1 wherein the image processors of the plurality of image processors each determine the combining-position information between the first image and the second image based on an average value of the combining-position information from image-matching of other images when the image-matching between the first image and the second image does not determine a single combining-position information from a plurality of combining-position information.

4. An image-reading apparatus comprising:
a line sensor group composed of line sensors arranged alternately in two rows in a same lengthwise direction, detection ranges of the line sensors next to each other in different rows partially overlapping as viewed in a direction orthogonal to the lengthwise direction,
a scan driver to cause the line sensor group and a subject to be captured, to be relatively scanned in a direction that is orthogonal to the lengthwise direction, and
the image-combining apparatus according to claim 1 to combine together images of an image row that is captured by the line sensor group during relative scanning by the scan driver.

5. An image-combining method comprising:
a first step of concurrently performing processing to detect, by image-matching, combining-position information for combining a first image within one group and a second image in a position that is adjacent to the first image in an image row without any positional displacement by respective image processors of a plurality of image processors provided for respective groups of images formed by grouping of the images into sequentially ordered images, each image in the image row having an overlapping portion that is a portion overlapping with a portion of another image, the image row having adjacent images that have the overlapping portions corresponding to a same portion of an object;

a second step of transferring, prior to the first step, an image of the overlapping portion of the second image belonging to a group different from the first image to the image processor that processes the first image having an overlapping portion corresponding to the same portion of the object, the image of the overlapping portion of the second image being a head of the images of a group corresponding to each image processor of the plurality of image processors;

a third step of transferring, between the plurality of image processors, combining-position information between the first image and the second image belonging to a group different from the first image; and a fourth step of performing combining, by the image processors, based on the combining-position information self-detected and the combining-position information that is transferred via the combination-information transferring path, the images belonging to the corresponding group without any positional displacement while combining the images belonging to the corresponding group with an image belonging to another group without any positional displacement between adjacent images of different images across different groups.

6. An image-reading apparatus comprising:
a line sensor group composed of line sensors arranged alternately in two rows in a same lengthwise direction, detection ranges of the line sensors next to each other in different rows partially overlapping as viewed in a direction orthogonal to the lengthwise direction,
a scan driver to cause the line sensor group and a subject to be captured, to be relatively scanned in a direction that is orthogonal to the lengthwise direction, and
the image-combining apparatus according to claim 2 to combine together images of an image row that is captured by the line sensor group during relative scanning by the scan driver.

7. An image-reading apparatus comprising:
a line sensor group composed of line sensors arranged alternately in two rows in a same lengthwise direction, detection ranges of the line sensors next to each other in different rows partially overlapping as viewed in a direction orthogonal to the lengthwise direction,
a scan driver to cause the line sensor group and a subject to be captured, to be relatively scanned in a direction that is orthogonal to the lengthwise direction, and
the image-combining apparatus according to claim 3 to combine together images of an image row that is captured by the line sensor group during relative scanning by the scan driver.

* * * * *